US012400850B2

(12) United States Patent
Li et al.

(10) Patent No.: US 12,400,850 B2
(45) Date of Patent: Aug. 26, 2025

(54) CAPILLARY EMITTER WITH ELECTROSPRAY IONIZATION PROVIDING FEMTOLITER TO NANOLITER FLOW RATES

(71) Applicants: University of New Hampshire, Durham, NH (US); Thermo Finnigan LLC, San Jose, CA (US)

(72) Inventors: Anyin Li, Somersworth, NH (US); Linfan Li, San Jose, CA (US); Mengtian Li, Durham, NH (US)

(73) Assignees: University of New Hempshire, Durham, NH (US); Thermo Finnigan LLC, San Jose, NM (US)

( * ) Notice: Subject to any disclaimer, the term of this patent is extended or adjusted under 35 U.S.C. 154(b) by 391 days.

(21) Appl. No.: 17/997,596

(22) PCT Filed: May 11, 2021

(86) PCT No.: PCT/US2021/031735
§ 371 (c)(1),
(2) Date: Oct. 31, 2022

(87) PCT Pub. No.: WO2021/231398
PCT Pub. Date: Nov. 18, 2021

(65) Prior Publication Data

US 2023/0187196 A1 Jun. 15, 2023

Related U.S. Application Data

(60) Provisional application No. 63/024,147, filed on May 13, 2020.

(51) Int. Cl.
*H01J 49/16* (2006.01)
*B05B 5/025* (2006.01)

(52) U.S. Cl.
CPC .......... *H01J 49/167* (2013.01); *B05B 5/0255* (2013.01)

(58) Field of Classification Search
CPC .... H01J 49/165; H01J 49/167; H01J 49/0404; B05B 5/0255
See application file for complete search history.

(56) References Cited

FOREIGN PATENT DOCUMENTS

WO 2016/145041 9/2016
WO WO-2016145041 A1 * 9/2019 .............. H01J 49/00
WO 2019/241694 12/2019
WO WO-2019241694 A1 * 12/2019 ........... G01N 1/4022

OTHER PUBLICATIONS

Japan Patent Office, Office Action issued in Japanese patent application 2022-569594 (Mar. 12, 2024).
International Search Report and Written Opinion from corresponding PCT Appln. No. PCT/US2021/031735, dated Sep. 3, 2021.

* cited by examiner

*Primary Examiner* — David E Smith
(74) *Attorney, Agent, or Firm* — Finch & Maloney PLLC

(57) ABSTRACT

The present disclosure relates to an apparatus and method to achieve electrospray ionization at femtoliter/minute to nanoliter/minute flow rates including relatively rapid alternation between such flow rates within the same device. These flow rates provide enhanced and relatively more uniform ionization of sprayed compounds for subsequent analytical evaluations.

18 Claims, 9 Drawing Sheets

| Discharge plasma conditions | Parameters |
|---|---|
| Plasma to capillary **(a)** | -3-3 mm |
| Parallel distance **(point symmetry, b)** | 0-5 mm |
| Pusher electrode to the capillary **(c)** | -3-15 mm |

| Discharge plasma conditions | Parameters |
|---|---|
| Plasma to capillary **(a)** | -3-3 mm |
| Parallel distance **(point symmetry, b)** | 0-5 mm |
| Pusher electrode to the capillary **(c)** | -3-15 mm |

CAPILLARY EMITTER WITH ELECTROSPRAY IONIZATION PROVIDING FEMTOLITER TO NANOLITER FLOW RATES

CROSS REFERENCE TO RELATED APPLICATIONS

This application claims priority of U.S. Provisional Appl. No. 63/024,147, filed May 13, 2020, the teachings of which are incorporated herein by reference.

FIELD

The present disclosure relates to an apparatus and method to achieve electrospray ionization at femtoliter/minute to nanoliter/minute flow rates including relatively rapid alternation between such flow rates within the same device. These flow rates provide enhanced and relatively more uniform ionization of sprayed compounds for subsequent analytical evaluations.

BACKGROUND

Electrospray ionization (ESI) is an ionization method that produces intact molecular ions from solution phase samples. It is extensively applied in the mass spectrometry (MS) analysis of organic and biological samples. An existing challenge of ESI is that ionization efficiency of analytes is flow-dependent and sample-dependent, and lower flow rates reportedly provided improved ionization efficiency and higher analytical sensitivity. While there is no theoretical limit for the lowest flow rate that can be used for electrospray ionization, the efforts to lower ESI flow rates by employing relatively smaller emitter tips have been constrained by practical obstacles such as emitter clogging, nanometer tip fabrication, and sample handling.

SUMMARY

A device for delivery of a liquid sample at a selected flow rate comprising a capillary emitter having an outlet including inner and outer wall portions and an extended component affixed to the inner wall of the capillary emitter to provide one or more sub-channels for fluid flow. The device also includes a plasma discharge source to provide plasma ions and an electric field source to direct plasma ions to the capillary emitter outlet. The capillary emitter provides a capillary liquid flow rate at the capillary emitter outlet in the range of 50 femtoliters/minute (fL/min) to 500 nanolters/minute (nL/min).

In method form the present invention relates to the delivery of a liquid sample at a selected flow rate comprising providing a capillary emitter having an outlet including inner and outer wall portions and an extended component affixed to the inner wall of the capillary emitter to provide one or more sub-channels for liquid sample fluid flow, along with a plasma discharge source and an electric field source. One may then form plasma ions and provide an electric field and introduce a liquid sample into said capillary emitter and provide at the capillary emitter outlet a liquid sample flow rate in the range of 50 femtoliters/minute (fL/min) to 500 nanolters/minute (nL/min). The liquid output of the emitter can then undergo electrospray ionization for introduction into a mass spectrometer for subsequent analyte analysis.

DETAILED DESCRIPTION

Figure 1:
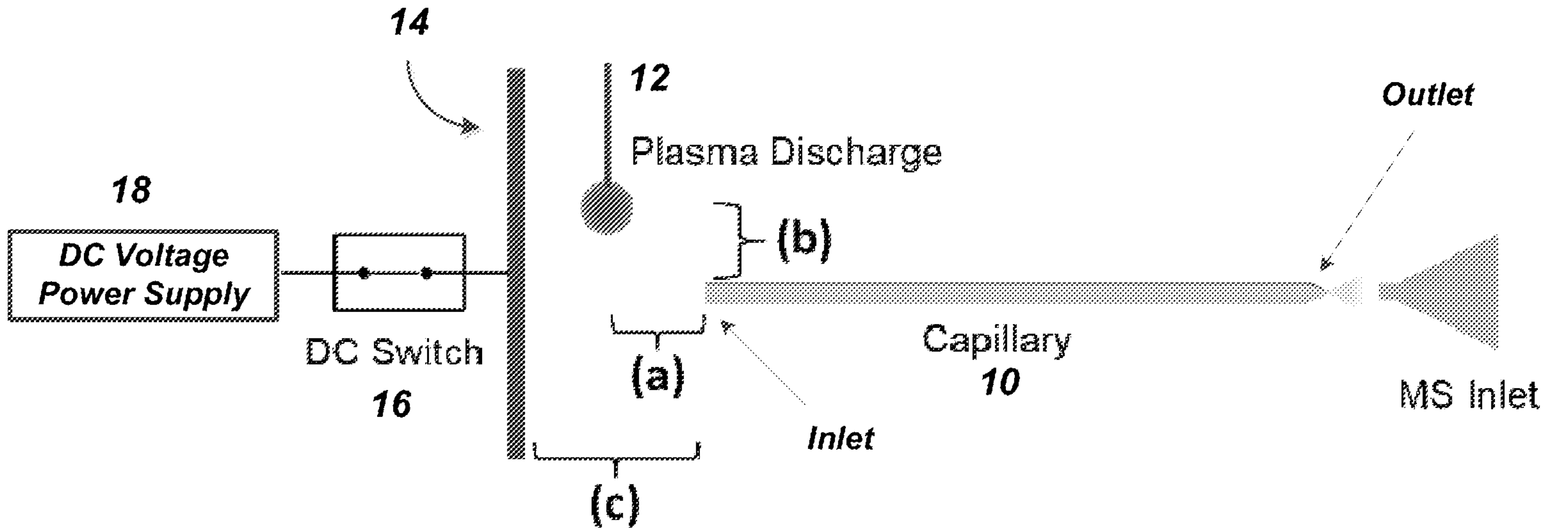
FIG. 1 is a general view illustrating the plasma discharge, DC voltage source, pusher electrode, capillary emitter and their preferred positions.

The present disclosure relates to an capillary emitter and method to achieve electrospray ionization at femtoliters/minute (fL/min) to nanoliter/minute (nL/min) flow rates including relatively rapid alternation between such flow rates within the same device. Attention is directed to FIG. 1 which provides an initial general view of the capillary emitter 10, plasma discharge metal wire 12, electric field source that may be preferably provided by pusher electrode 14, DC switch 16 and high voltage power supply 18. The high voltage power supply via DC switch 16 that is connected to the pusher electrode 14 preferably provides 0-5 kilovolts (kV) in positive polarity mode or 0-5 kV in negative polarity mode. One may also utilize a plurality of pusher electrodes.

The plasma discharge metal wire 12 is preferably connected to a piezoelectric transformer that provides AC current to ionize gases that are present around the capillary emitter 10. The piezoelectric transformer may provide 2 kV to 10 kV at power levels of 1.0 watt. At this condition, a piezoelectric discharge plasma is preferably formed that generates adequate cations and anions, preferably in continuous manner, as can be observed by mass spectrometer analysis, in the positive and negative mode. Typical air plasma ions, such as protonated water clusters $[(H_2O)_nH]^+$ and anions ($O_2^-$, $OH^-$, $NO_2^-$) can be generated.

As can also be seen in FIG. 1, the distance "a" which is the distance of the plasma discharge to the entrance of capillary emitter may preferably vary from −3.0 mm to +3.0 mm. However, in the broad context of the present disclosure, it should be appreciated that the plasma ions that are ultimately formed need only be present at the capillary emitter outlet or tip 22 (see FIG. 2) to provide a plasma-liquid contact at the outlet tip location. The parallel distance "b" of the opening of the plasma discharge to the capillary emitter 10 may preferably vary from 0 to 5.0 mm. The distance "c" of the pusher electrode to the entrance of the capillary emitter may very from −3.0 mm to 15.0 mm. The output of the capillary emitter may then be introduced to the inlet of a mass spectrometer (MS).

Attention is next directed to FIG. 2 which provides a further illustration of the capillary emitter 10 with electrospray ionization. The capillary emitter 10 may preferably be relatively round or tubular but other geometries are contemplated and are not considered limiting. The capillary emitter 10 includes an extended component 11 that is preferably attached to and extends along the inner wall of the capillary emitter 10 and protrudes from the inner wall. This extended component itself may be referred to herein a rod or filament, preferably formed of glass, and attached to the inner wall of the emitter. This extended component that is attached to the inner wall of the capillary emitter is then utilized to form what may be described as one or more sub-channels for liquid flow. Reference to a sub-channel is to be understood as a portion of the internal surface of the capillary emitter that defines a general pathway for the flow of liquid which may be assisted by capillary action. Such extended component may therefore preferably provide for the formation of two sub-channels on either side of the extended component for liquid flow delivery to the outlet of the emitter, as further described herein. In addition, the geometry of such extended component may vary and comprise, e.g, round, oval or other shapes.

Figure 2A:
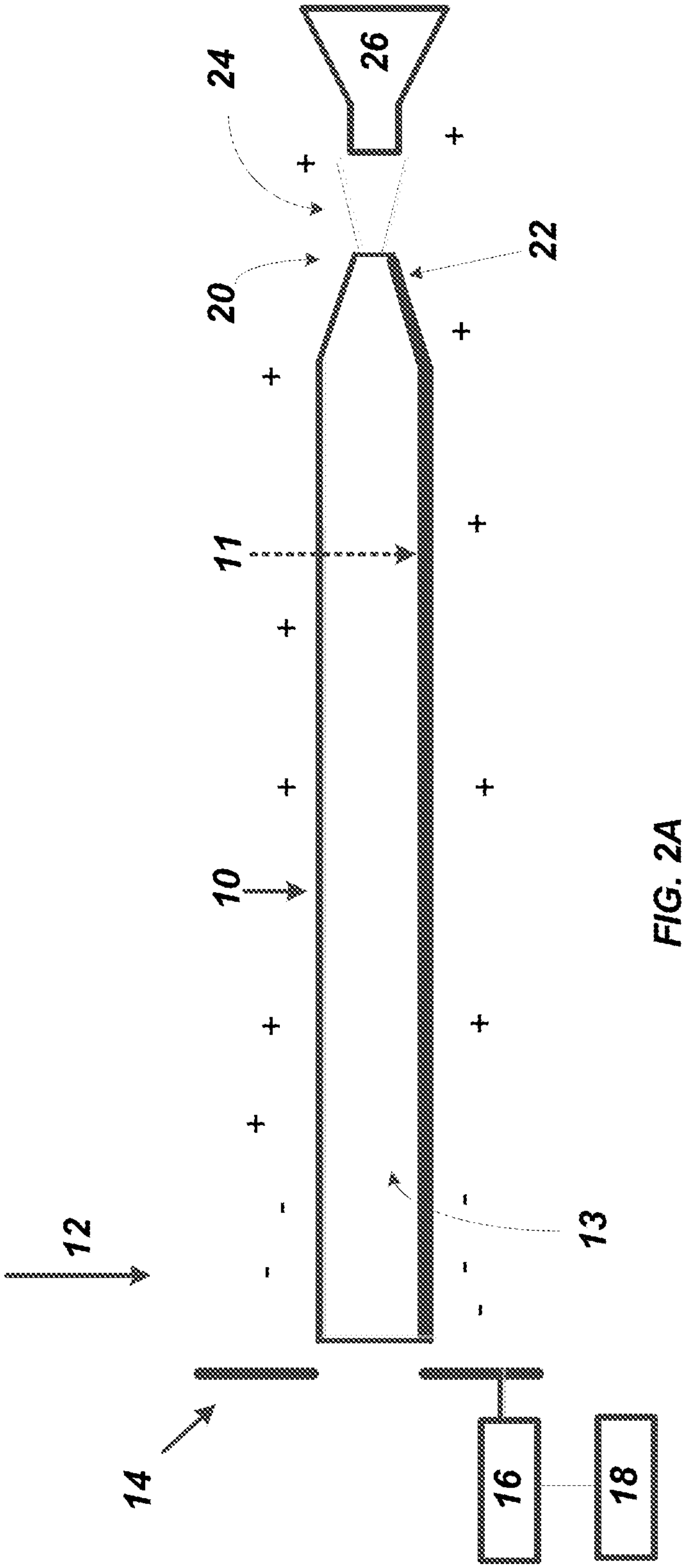
FIG. 2A is a schematic of an embodiment of a capillary emitter including a filament glass rod, a piezoelectric transformer showing plasma ion formation.

In addition, as can be seen in FIG. 2A, this extended component 11 preferably travels along all or a majority of the length of the inner wall of emitter 10. Furthermore, when extended component 11 is preferably made of a solid glass rod and the emitter 10 is similarly made of glass, the glass rod may be conveniently attached to the inner wall of the emitter 10 by annealing. In such a situation the extended component 11 may be identified as a glass filament.

Figure 2B:
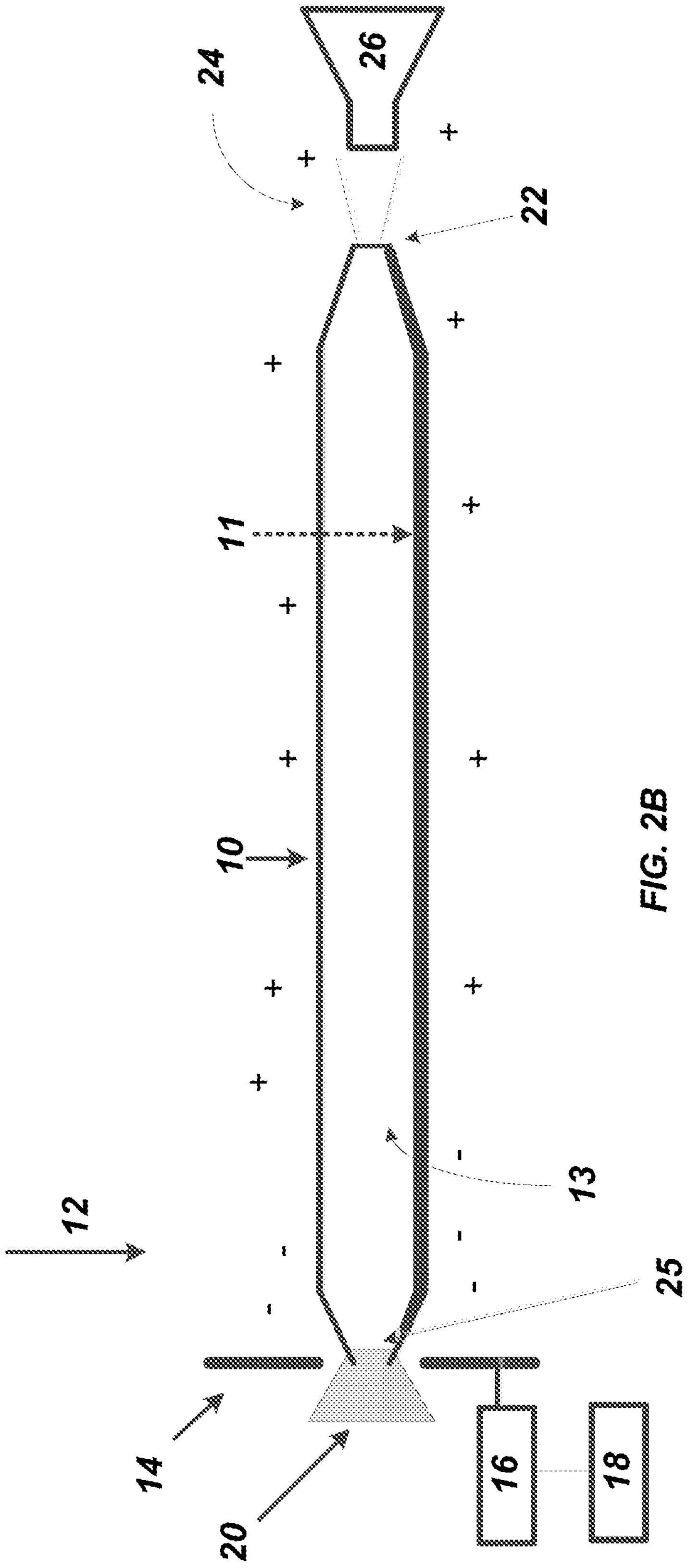
FIG. 2B is a schematic of an embodiment of a capillary emitter including a filament glass rod, a piezoelectric transformer showing plasma ion formation, where the capillary emitter has an inlet for introduction of sample solution.

On the proximal end of the emitter 10 the capillary emitter 10 again includes a DC voltage source 18 that is connected to a DC voltage switch 16. The voltage switch is again shown connected to pusher electrode 14 where upon charging the electrodes provide an electric field that serves to push positive (+) or negative (−) plasma ions towards the distal end of the capillary emitter at the outlet or emitter tip 22. As noted above, one may utilize a plurality of pusher electrodes. Sample solution 20 may be loaded into the emitter by at least three preferred methods. One method as shown in FIG. 2A is to load sample solution 20 at the distal end of the capillary emitter, i.e. at emitter tip outlet opening 22. As next shown in FIG. 2B, the capillary emitter 10 may include at its proximal end an opening inlet 25 for introduction of sample solution 20. This opening inlet can also preferrably be tapered, as shown in FIG. 2B. Although FIG. 2B shows one inlet, it should be appreciated the there may be a plurality of inlets, such as 2-10 inlets for introduction of a sample solution. In either case, upon operation of the emitter 10, a spray or plume of charged droplets is then formed is identified at 24 which may then be introduced into a mass spectrometer 26. In addition, it should be noted that the inlet of the mass spectrometer may provide an electric field potential, similar to the function of the electrode 14, to direct plasma ions towards the distal end of the capillary emitter at the outlet or emitter tip 22. Such a mass spectrometer inlet providing a separate electric field potential may then be used alone or in combination with the one or more pusher electrodes 14.

With regards to preferred dimensions, the capillary emitter 10 preferably has a length in the range of 50 μm to 50 cm, an inner diameter (ID) of 2.0 nanometers (nm) to 3.0 millimeters (mm) and an outer diameter (OD) in the range of 0.005 mm to 5.0 mm. As alluded to above, the capillary emitter is also one that may include a separate inlet for introduction of a liquid sample and for formation of the electrospray plume, respectively. Such optional inlet for introduction of liquid sample may preferably have a diameter in the range of 0.001 mm to 0.5 mm. The extended component 11 preferably has an OD in the range of 0.01 μm to 100.0 μm. The OD of the extended component is selected such that it is smaller than the ID of the capillary emitter opening and provides for the one or more subchannels for liquid flow.

The capillary emitter when made of glass can be preferably heated at its distal end and a tapered emitter tip outlet opening 22 is then preferably formed by pulling on the heated glass. Alternatively, one may heat capillary tubing at about its midsection and pull the ends in opposite direction wherein the tubing then breaks forming two emitter tip outlet openings. It is also contemplated that one may immerse the tubing into an etching medium where the emitter tip may then be formed.

Similarly, a tapered tip inlet opening 25 at the proximal end may be formed by such heating and pulling. The tapered emitter tip outlet opening preferably falls in the range of 5.0 nm to 20.0 μm. More preferably, the tapered emitter tip outlet opening 22 preferably defines an opening diameter in the range of 1.0 μm to 10.0 μm, or 1.0 μm to 5.0 μm. In addition the extended component or glass rod 11 in the emitter tip is reduced in diameter within the tip 22 to an outer diameter preferably in the range of 1.0 nm to 5.0 μm. Again, the outer diameter of the extended component in the emitter tip is selected so that it is relatively smaller than the opening diameter of the emitter tip so that the extended component provides one or more subchannels for fluid flow.

Figure 3B:
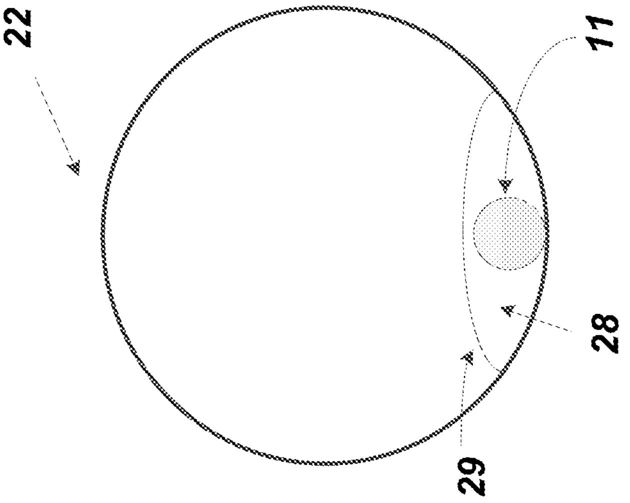
FIG. 3B is another front view of the opening of the emitter tip.
Figure 3A:
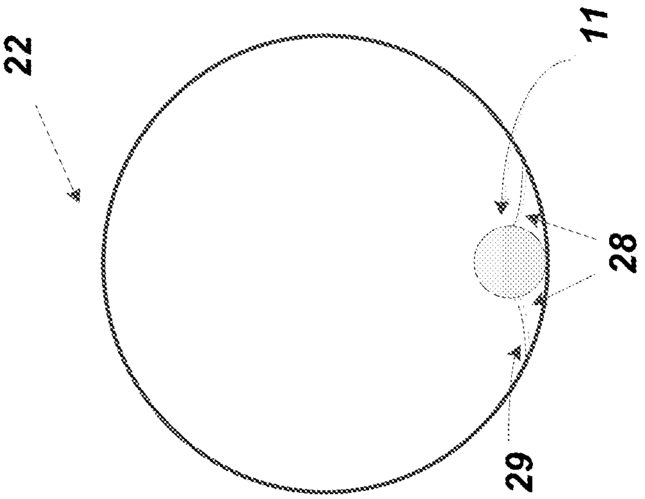
FIG. 3A is a front view of the opening of the emitter tip.

A front-view of the opening of the emitter tip is provided in FIG. 3A. As can be seen, the sample solution that is introduced into the emitter is preferably present in one or more capillary flow subchannels 28 that may preferably form on either side of the extended component 11. In FIG. 3B it can be observed that there can be one capillary flow subchannel 28 formed that preferably surrounds the extended component 11. In either case, it can be observed that at the emitter tip, one can now provide a liquid level 29 or meniscus that is relatively smaller than the size than the opening of the emitter tip due to plasma ion-liquid contact at the emitter tip location, as further described herein. As noted above the emitter tip opening itself may have an opening diameter in the range of 5.0 nm to 20.0 μm. In addition, the one or more capillary flow channels 28 provides and maintains a fluid level that is relatively smaller than the emitter outlet or tip opening. The maximum width or height of such relatively smaller fluid level at the emitter outlet is preferably 500 to 2000-fold smaller than the main channel 13 inner diameter range, noted above. It is also worth noting that the main channel defined by the capillary emitter is contemplated to assist in providing a relatively saturated vapor pressure within the emitter to reduce or prevent evaporation of the relatively low flow rates that now may be developed in the one or more sub-channels, at either the femtoliter/minute or picoliter/min flow rate regimes.

In a representative process, the solution 20 for ensuing mass spectroscopy analysis migrates to the emitter tip 22 and gradually fills the tip and then any taper in the capillary emitter from the main body towards such tip. The migration is generally the result of capillary action. When the solution first arrives at the emitter tip, the tip opening becomes partially filled such that a liquid level 29 that is relatively smaller than the emitter opening is provided. Via use of one or more pusher electrodes and plasma as described further herein, when electrospray ionization is now triggered to this liquid level at the emitter tip, at a consumption rate that equals the capillary flow of liquid towards the emitter tip, such relatively smaller liquid level will be maintained in a dynamic equilibrium and the electrospray flow rate can then be determined by the capillary flow along the extended component 11. Accordingly, the reference to a dynamic equilibrium should therefore be broadly understood as the characteristic where the flow within the emitter towards the emitter tip can be maintained at a selected and preferably continuous flow rate which then maintains a liquid level within the emitter tip at a selected size that is relatively smaller than the emitter tip opening.

This ability to provide a liquid level 29 that is relatively smaller than the actual emitter outlet tip opening, along with the capillary liquid flow in the one or more subchannels, now affords the ability to provide capillary emitter flow rates and electrospray ionization (ESI) in the range of 50 femtoliters/minute (fL/min) to 500 nanolters/minute (nL/min). Electrospray ionization herein is reference to the ejection of a charged liquid from the liquid at the emitter opening 22 where the electric force overcomes the surface tension of the liquid at the emitter tip location. Preferably, one may now more particularly provide flow rates for ESI in the range of 50 picoliters/minute (pL/min) to 150 nL/min. As further discussed herein, one may also alternate on demand between flow rates of fL/min and nL/min, or between flow rates of pL/min and nL/min, within the same device. This aforementioned alteration in flow rates may preferably occur over a period of 10 microseconds (μs) to 1.0 second. In addition, the flow rates herein in the range of 50 fL/min to 500 nL/min, or preferably 50 pL/min to 150 nL/min, may be maintained as continuous for a time period of up to 10.0 hours.

Accordingly, it may now be appreciated that a relatively high voltage piezoelectric transformer generates an alternating current discharge plasma on the tip of metal wire 12. The auxiliary electric field generated by the pusher electrode 14 pushes the positive or the negative plasma ions to the outlet of the capillary emitter, where the liquid level that is smaller than the outlet opening is charged to generate ESI. The plasma ions are transported through the space external to the capillary and are delivered at the opening of the emitter tip 22. The plasma ions can be typical plasma-type ions such as protonated water clusters $[(H_2O)_nH]^+$ or $O_2^-$, $NO_2^-$, etc., when the pusher electrode was set to positive or negative mode, respectively. Sample solution in the emitter tip 22 was readily ionized by these charges to produce ESI-type ions. This method also can provide a continuous supply of charge which is suitable for the relatively low flow ESI noted herein, namely in the range of 50 picoliters/minute (pL/min) to 150 nL/min.

The ESI from sub-channel 28 produced liquid spray plumes that were barely visible, yet stable ion signals when the formed ESI-type ions were evaluated by mass spectrometry. Various compounds, including illicit drugs such a cocaine, environmental contaminants, amino acids, oligosaccharides, peptides and proteins were successfully ionized by the capillary emitter 10 herein to typical ESI-type ions. A non-limiting listing of compounds that were found suitable for use in 5 the capillary emitter 10 herein is listed below in Table 1, along with the mass spectroscopy mode for their analysis and the analyte ion identified:

TABLE 1

Compounds Evaluated in the Capillary Emitter and Ions Generated

| Compounds | MS Modes | Analyte Ion |
|---|---|---|
| PFCs mixtures | neg | $[M-H]^-$ |
| TNT | neg | $[M-H]^-$ |
| 4-Nitrophenol/ 3-Nitrophenol | neg | $[M-H]^-$ |
| Ethidium | pos | $[M]^+$ |
| Dopamine | pos | $[M+H]^+$ |
| Cocaine | pos | $[M+H]^+$ |
| Propranolol | pos | $[M+H]^+$ |
| 1,4-Maltose | neg/pos | $[M+Cl]^-/[M+Na]^+$ |
| Turanose | pos | $[M+Na]^+$ |
| Maltoheptaose | pos | $[M+Na]^+$, $[Mhep+NH_4]^+$ |
| Octyl D-glucopyranoside | pos | $[M+Na]^+$ |
| Glutamic acid/ isotope $^{13}C_5$, $^{15}N$ | neg | $[M-H]^-$ |
| Methionine | neg/pos | $[M-H]^-/[M+H]^+$ |
| Methionine Sulfoxide | neg/pos | $[M-H]^-/[M+H]^+$ |
| MRFA | pos | $[M+H]^+$ |
| Angiotensin I | pos | $[M+2H]^{2+}$, $[M+2Na]^{2+}$, $[M+H]^+$, $[M+Na]^+$ |
| Angiotensin II | pos | $[M+2H]^{2+}$, $[M+H+Na]^{2+}$, $[M+2Na]^{2+}$, $[M+H]^+$, $[M+Na]^+$ |
| Bradykinin | pos | $[M+2H]^{2+}$, $[M+H+Na]^{2+}$, $[M+2Na]^{2+}$, $[M+H]^+$, $[M+Na]^+$ |
| Mellitin | pos | $[M+4H]^{4+}$, $[M+3H]^{3+}$ |
| Neurotensin | pos | $[M+3H]^{3+}$, $[M+2H]^{2+}$, $[M+H+Na]^{2+}$, $[M+2Na]^{2+}$, $[M+H]^+$ |
| Substance P | pos | $[M+3H]^{3+}$, $[M+2H]^{2+}$, $[M+H+Na]^{2+}$, $[M+2Na]^{2+}$, $[M+H]^+$, $[M+Na]^+$ |
| Vancomycin | pos | $[M+2H]^{2+}$, $[M+H+Na]^{2+}$ |

Accordingly, the capillary emitter 10 herein that is now capable of the aforementioned reduced flow rates can be applied to any analyte compounds that may otherwise have been found suitable for conventional electrospray ionization employed in mass spectrometry to produce ions. In the above, "M" refers to the molecular ion that may be present in either the indicated positive ion mode or negative ion mode. This is sometimes generally referred to as electrospray ionization mass spectrometry (ESI-MS).

It can also be added that supplying charges using plasma ions formed from the plasma discharge 12 along with the presence of subchannel 28 and plasma ion-liquid contact at the emitter tip, allowed for the ability to achieve the above referenced flow rate in the capillary emitter of 50 pL/min to 500 nL/min with emitter tip openings in the range of 160 nm to 20.0 μm. By comparison, similar emitter tips with an external metal coatings were tested using a conventional DC power supply. Although solution delivery along a filament was replicated, creating a continuous electrospray from the sub-channel therein was found to be relatively challenging using relatively high voltage applied on the metal coating. Instead, a pulsed electrospray was observed. Increasing the voltage did not assist and lead to air breakdown. This pulsating phenomenon was not observed when using the capillary emitter 10 herein that as noted, utilized plasma formation, plasma ion-liquid interaction and one or more pusher electrodes.

As noted above, the present disclosure allows one to alternate on demand between flow rates at a relatively lower rate of fL/min and a relatively higher rate nL/min, or preferably between a relatively lower rate of pL/min and a relatively higher rate of nL/min, within the same device (capillary emitter 10). Expanding on this capability, it is noted that electronically turning off the pusher voltage source 18 in the middle of, e.g., a pico flow regime shut down the electrospray, allowing the capillary flow to fill the main-channel 13 of the capillary emitter 10. See FIG. 2. Turning the pusher voltage back on initiated nano flow (3-5 nL/min) ESI from the main-channel. Once the solution accumulated in the main-channel was consumed, the ESI returned to the sub-channel and relatively lower pico flow regime. The transition from a relatively higher nano flow to relatively lower pico flow regimes was accompanied by the disappearance of an electrospray plume 24 and changes in relative ion intensities. By simply switching the pusher voltage on and off, relatively rapid alternation between pico and nano flow was therefore achieved in the capillary emitter 10. As noted earlier, this relatively rapid alternation between either fL/min to nL/min, or preferably between pL/min to nL/min, within the capillary emitter 10, can occur over a preferred time period of 10 microseconds (μs) to 1.0 second.

Working Procedures/Examples

The set-up illustrated in FIG. 1 was preferably constructed as follows. The plasma ions were generated by using a piezoelectric transformer (53×7.5×2.6 mm, INC model SMSTF68P10S9, Steiner & Martins). The piezoelectric transformer was operated by supplying an input voltage (5-25 V, Powertron Model 500A; Industrial Test Equipment Co. Inc., Port Washington, NY, USA) triggered by a sine waveform from a signal generator (Koolertron). Plasma discharge was readily generated at the tip of the output electrode under ambient conditions. The faint plasma may be observed by naked eye. A pusher electrode (44×44 mm) charged to 0-4 kV was placed behind the capillary emitter and plasma to create an auxiliary electric field, which pushed positive or negative plasma ions to the capillary emitter.

Emitter Outlet Tip Formation: A micropipette puller (model P-1000, Sutter Instrument, CA) was used for pulling emitters. Borosilicate glass capillaries, with and without the extended component 11, (o.d., 1.5 mm; i.d., 0.86 mm; BF 150-86-10 and B 150-86-10) was employed. The emitter tips were checked by bright-field microscopy (Olympus IX73), as well as measured by a field emission scanning electron microscopy (TESCAN LYRA3). A micro butane torch and wax were used to seal the proximal end of emitters when needed.

At least three different exemplary methods may be utilized for loading sample solutions to the emitter and to achieve the flow rate control identified herein. Solution may be loaded to the distal emitter tip 22, solution may be loaded into the proximal end of the capillary emitter 10, or solution may be periodically supplied to the proximal end which may optionally be present in tip form.

The flow rates of the ESI can be determined using one of the following two methods.

Measurement method #1 is based on gravimetric analysis of the capillary emitter before and after spraying for a period. Given the spray time, the weight lost, and the density of the solution, the flow rate can be determined. The weight measurements were carried out using a Mettler Toledo MX5 microbalance (Mettler-Toledo, Columbus, OH; repeatability reported by manufacturer is ±0.8-0.9 μg). The total weight of capillary emitters typically ranged 0.134823-0.147074 gram. Standard deviations ranging 0.5-3 μg were obtained when weighing capillary emitters for 3 times in the experiments. The standard deviations before ($e_1$) and after ($e_2$) electrospray plugged into the equation $e=\sqrt{e_1^2+e_2^2}$ to calculate the propagated error e. This propagated weight error e was divided by solution density and spray time obtain the flow rate error in each experiment. In one experiment, the standard deviations before and after spraying were $1.4\times10^{-6}$ g and $2.1\times10^{-6}$ g. Divided by the solvent density (0.927 g/mL for methanol:water 1:1) and the 30 min spray time, a measurement error of 91 pL/min was obtained. Longer spray time (up to 300 minutes) was used to ensure the measurement error was at most ⅓ of the flow rate. Control experiments indicate that wax-sealing of the proximal end is every effective. Evaporation loss of the loaded solution from the distal end over the period of experiment has always been less than 10% of the volume consumed by ESI.

Measurement method #2 is based on volume of solution accumulated in the tip emitter over time. This method was used when nested-ESI was alternated between picoflow and nanoflow regimes. When sub-channel ESI is equilibrated, solution flow rate in the sub-channel is approximately equal to the electrospray consumption rate. Temporarily shutting down the electrospray, solution will be accumulated in the emitter tip. Assuming the solution flow rate is constant in the first 12 seconds of accumulation, accumulated volume over time will allow the calculation of flow rate in picoflow ESI. Likewise, flow rates for the nanoflow regimes may be calculated by how fast the accumulated solution is consumed, on top of the sub-channel flow. In the experiments, videos were taken using a camera at 30 frame per second. Lengths in the video were calculated using a known object, 2.14 mm/228 pixels. The volume was calculated by measuring the height (h) and radius (r=kh for a fixed cone shape) of the cone shaped solution. This calculated volume by $V=\frac{1}{3}\pi kh^3$, was then divided by the time elapsed to yield the flow rate. In one example, the length of the accumulated solution was 11 pixels, giving a calculated volume of 9.5 pL. For a spray time of 0.17 min, this corresponds to a flow rate of 56 pL/min. The error in this flow rate was estimated using the potential error brought by miscounting 1 pixel during the volume calculation. 1 pixel per 11 pixel corresponds to a relative error of 9.1% for h. Considering the $V=\frac{1}{3}\pi kh^3$ equation, the propagated error for the volume would be 27%. Relative error in time measurements, estimated based on supposedly miscounting one frame, are ~0.8% and always at least one order of magnitude smaller and thus omitted. In another example, the measured length of the bulk solution was 49 pixels, corresponding to a volume of 0.26 nL. For a spray time of 0.16 min, this corresponds to a flow rate of 1.6 nL/min. Propagated error from +1 pixel would be 6%.

Figure 4A:
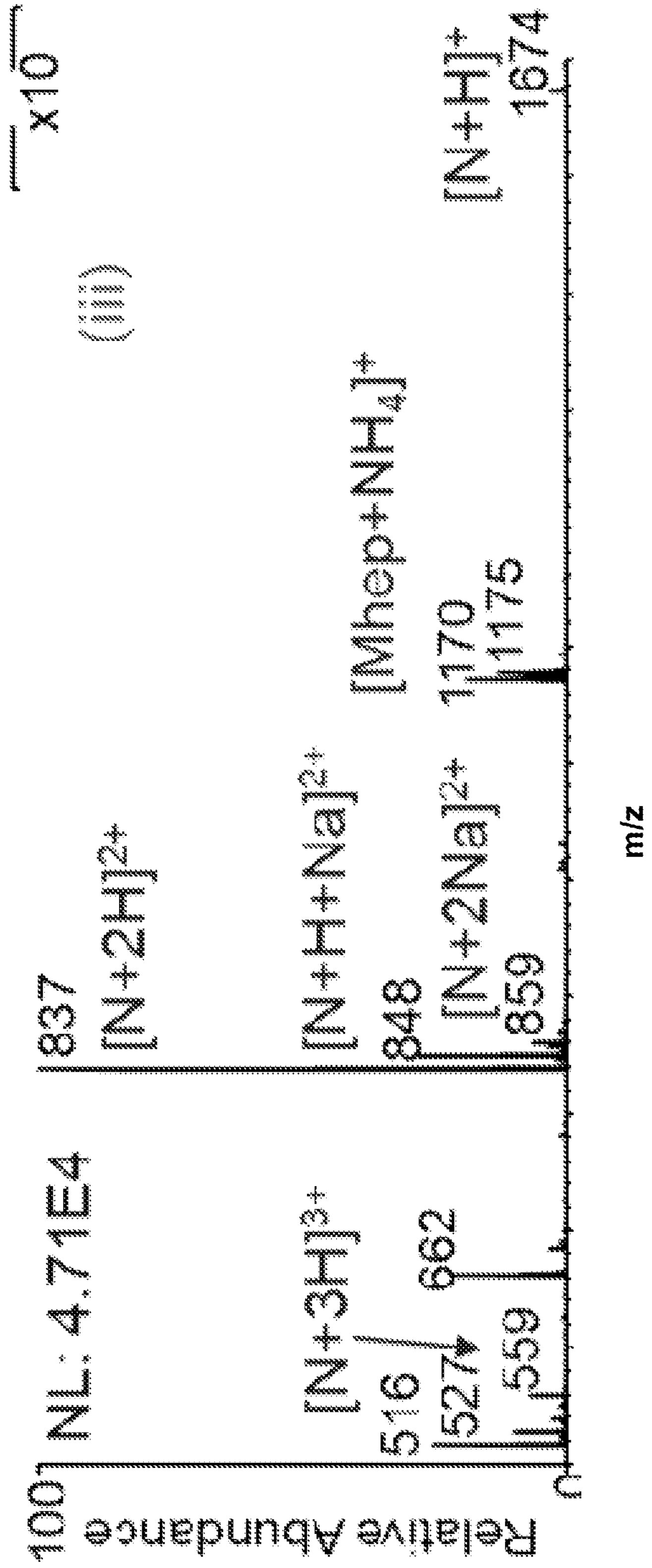
FIG. 4A is a mass spectra for an equal concentration (10 μM) mixture of maltoheptose (Mhep), a polysacharride, and neurotensin (a neuropeptide) at a relatively higher nano flow rate regime.
Figure 4B:
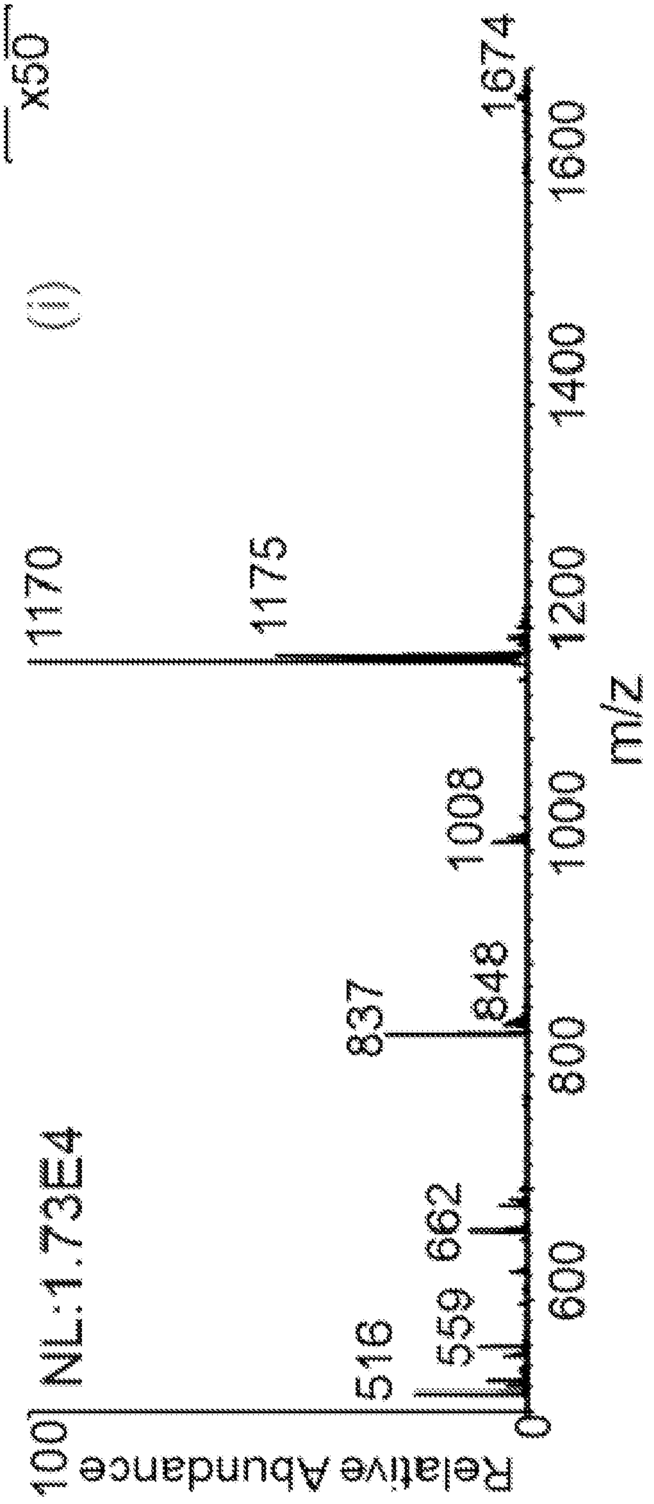
FIG. 4B is a mass spectra for an equal concentration (10 μM) mixture of maltoheptose (Mhep), a polysacharride, and neurotensin (a neuropeptide) at a relatively lower pico flow rate regime.

FIGS. 4A and 4B herein provide the mass spectra for an equal concentration (10 μM) mixture of maltoheptose (Mhep), a polysacharride, and neurotensin (a neuropeptide), while alternating the flow rates from a relatively higher nano flow rate regime (FIG. 4A) to a relatively lower pico flow rate regime (FIG. 4B), followed by mass spectra analysis. The nanoflow rate regime was 2 nL/min and the pico flow rate regime was 47 pL/min. Polysaccharides and peptides have differences in their surface activity so that the ionization efficiency (i.e. the relative ability to be ionized herein and undergo electrospray ionization) can be expected to respond differently to changes in flow rates. As can be observed, upon entry into the picoflow regime there is an observed drop of peptide ion signal and the signal intensity of the $[Mhep+NH_4]^+$ increased by about 9 fold relative to that of neurotensin. In addition, the absolute ion intensity of Mhep increased 2 fold. It may therefore be appreciated that by utilizing the pico or femtoliter flow regimes herein for the capillary emitter 10, the ionization efficiency of saccharide analytes can now be improved for ESI-MS.

Figure 5:
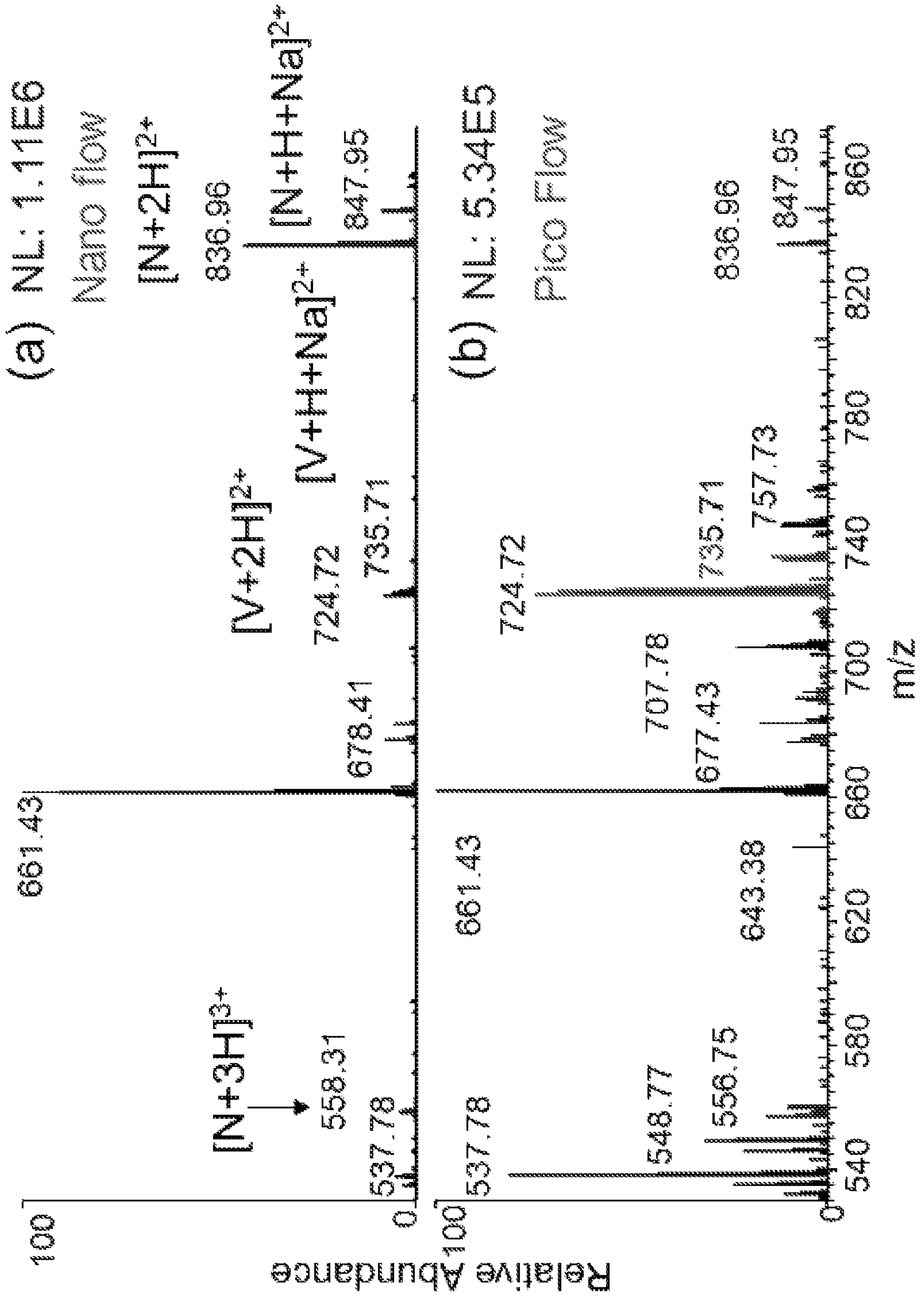
FIG. 5 provides the MS spectra for an equal concentration (10 μM) mixture of vancomycin and neurotensin in the nanoflow regime (a) and picoflow regime (b) of nested-ESI.

FIG. 5 provides the MS spectra for a mixture of vancomycin and neurotensin in the nanoflow regime (a) and picoflow regime (b) of nested-ESI. 10 μM vancomycin and neurotensin in mixture of MeOH and 10 mM ammonium acetate aqueous solution (v:v, 1:1); DC voltage, 1.5 kV; MS, LTQ velos Orbitrap. In the nanoflow regime, the integrated peak intensity for vancomycin peaks was 5 times lower than that of neurotensin. In the picoflow regime, integrated peak intensity decreased by 9.3-fold for neurotensin, and only by 2.5-fold for vancomycin. The absolute ion intensity for vancomycin did not increase. A 3.7-fold increase of relative ion intensity was observed for vancomycin over neurotensin in the picoflow regime and is significant and further demonstrates this method's wide applicability for analytes, particularly with glycan modifications.

Figure 6:
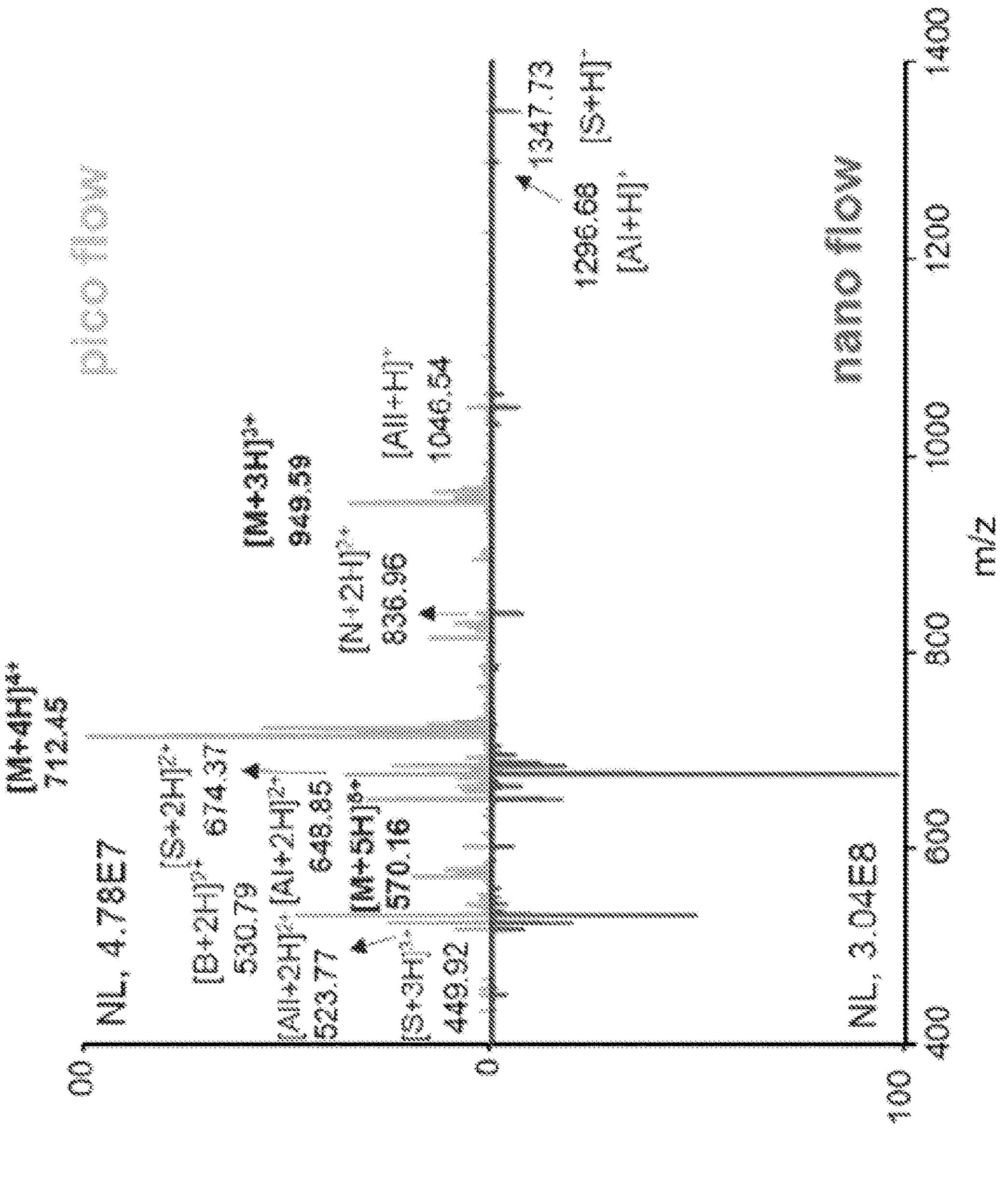
FIG. 6 provides a comparison of the full scan spectra of a mixture of peptides at the nanoflow and picoflow regimes.
Figure 7:
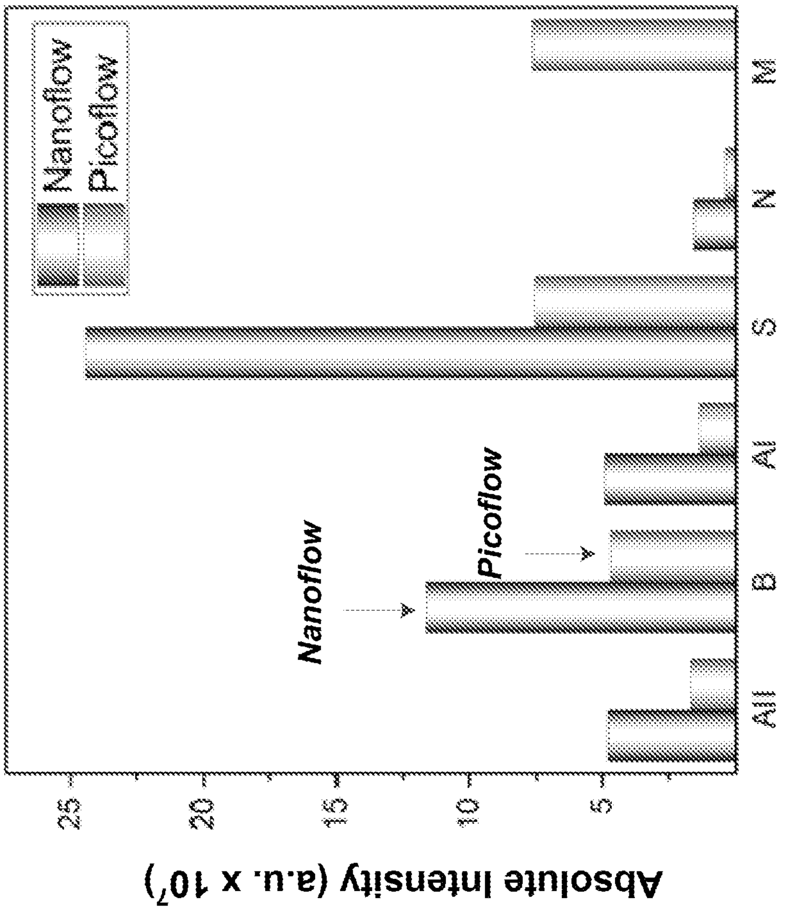
FIG. 7 provides the integrated peak intensities for the nanoflow and picoflow regimes in FIG. 6.

A mixture of an equal concentration peptide mixture (AII: Angiotensin II, B: Bradykinin, AI: Angiotensin I, S: Substance P, N: neurotensin, M: Melittin) was analyzed in the nanoflow and picoflow regimes utilizing the capillary emitter 10 described herein. The sample solution comprised 10 μM mixture of six peptides in a acetonitrile and water (v:v, 1:9). FIG. 6 provides a comparison of the full scan spectra. FIG. 7 provides the integrated peak intensities for the analytes for these two flow regimes. As can be seen, for these peptides, a relatively more uniform ion response was observed in the picoflow regime. The relative intensities (AII:B:AI:S:N) were 0.19:0.48:0.19:1.00:0.06 and 0.32:0.86:0.44:1.00:0.32, for the nanoflow and picoflow regimes, respectively.

The present invention is not limited to the foregoing examples and may include various modification. The working procedures/examples have been described in detail for facilitating an understanding of the present invention and are not necessarily limited to those provided.

The invention claimed is:

1. A device for delivery of a liquid sample at a selected flow rate comprising:

a capillary emitter having an outlet including inner and outer wall portions and an extended component affixed to the inner wall of said capillary emitter to provide one or more sub-channels for fluid flow;

a plasma discharge source to provide plasma ions; and an electric field source to direct said plasma ions to said capillary emitter outlet;

wherein said capillary emitter provides a capillary liquid flow rate at said capillary emitter outlet in the range of 50 femtoliters/minute (fL/min) to 500 nanoliters/minute (nL/min).

2. The device of claim 1 wherein said device provides a capillary liquid flow rate in the range of 50 picoliters/minute (pL/min) to 150 nL/min.

3. The device of claim 1 wherein said device is capable of alternating between a capillary flow rate at a relatively lower flow rate of fL/min and a relatively higher flow rate of nL/min.

4. The device of claim 1 wherein said device is capable of alternating between a capillary flow rate at a relatively lower flow rate of pL/min and a relatively higher flow rate of nL/min.

5. The device of claim 3 wherein said device alternates between said capillary flow rates of fL/min to nL/min over a period of 10 microseconds to 1.0 second.

6. The device of claim 4 wherein said device alternates between said capillary flow rates of pL/min to nL/min over a period of 10 microseconds to 1.0 second.

7. The device of claim 1 wherein said capillary emitter outlet comprises a tapered emitter tip.

8. The device of claim 7 wherein said tapered emitter tip comprises an opening in the range of 5.0 nm to 20.0 μm.

9. The device of claim 1 wherein said extended component has an outer diameter in the range of 0.01 μm to 100.0 μm.

10. The device of claim 1 including a DC voltage source that provides 0-5 kilovolts in either positive polarity mode or negative polarity mode to said electric field source.

11. The device of claim 1 wherein said plasma discharge provides plasma ions that are present at the capillary emitter outlet.

12. The device of claim 1 wherein said capillary emitter outlet has an opening diameter, and upon introduction of liquid sample to said capillary emitter, a liquid level is formed in said capillary emitter outlet that is smaller than said capillary emitter outlet opening diameter.

13. The device of claim 1 wherein said liquid at said capillary emitted outlet undergoes electrospray ionization.

14. The device of claim 1 wherein said capillary emitter outlet has a diameter and said fluid flow at said capillary emitter outlet provides a fluid level that is smaller than said outlet diameter.

15. A method delivery of a liquid sample at a selected flow rate comprising:

providing a capillary emitter having an outlet including inner and outer wall portions and an extended component affixed to the inner wall of said capillary emitter to provide one or more sub-channels for fluid flow, including a plasma discharge source and an electric field source;

forming plasma ions and providing an electric field to direct said plasma ions to said capillary emitter outlet; and introducing a liquid sample into said capillary emitter and providing at said capillary emitter outlet a liquid sample flow rate in the range of 50 femtoliters/minute (fL/min) to 500 nanoliters/minute (nL/min).

16. The method of claim 15 wherein said capillary liquid flow rate is in the range of 50 picoliters/minute (pL/min) to 150 nL/min.

17. The method of claim 15 further comprising alternating between a relatively lower flow rate of fL/min and a relatively higher flow rate of nL/min.

18. The method of claim 15 further comprising alternating between a relatively lower flow rate of pL/min and a relatively higher flow rate of nL/min.

* * * * *